United States Patent
Hong et al.

(10) Patent No.: US 10,823,548 B2
(45) Date of Patent: Nov. 3, 2020

(54) APPARATUS FOR INSPECTING SUBSTRATE AND METHOD THEREOF

(71) Applicant: KOH YOUNG TECHNOLOGY INC., Seoul (KR)

(72) Inventors: Young Joo Hong, Gwangmyeong-si (KR); Deok Hwa Hong, Gwangmyeong-si (KR); Min Kyu Kim, Gwangmyeong-si (KR); Jeong Hun Choi, Bucheon-si (KR)

(73) Assignee: KOH YOUNG TECHNOLOGY INC., Seoul (KR)

(*) Notice: Subject to any disclaimer, the term of this patent is extended or adjusted under 35 U.S.C. 154(b) by 29 days.

(21) Appl. No.: 16/202,450

(22) Filed: Nov. 28, 2018

(65) Prior Publication Data
US 2019/0162522 A1    May 30, 2019

(30) Foreign Application Priority Data

Nov. 28, 2017  (KR) .................. 10-2017-0160680
Nov. 7, 2018   (KR) .................. 10-2018-0136165

(51) Int. Cl.
*G01B 11/06* (2006.01)
*G01N 21/95* (2006.01)
(Continued)

(52) U.S. Cl.
CPC ...... *G01B 11/0675* (2013.01); *G01B 9/02091* (2013.01); *G01N 21/64* (2013.01); *G01N 21/95* (2013.01)

(58) Field of Classification Search
CPC ............ G01B 11/0675; G01B 9/02091; G01B 11/2441; G01B 9/02063; G01B 11/026;
(Continued)

(56) References Cited

U.S. PATENT DOCUMENTS

| 5,465,154 A | 11/1995 | Levy |
| 5,530,551 A | 6/1996 | Cantrall et al. |
(Continued)

FOREIGN PATENT DOCUMENTS

| CN | 1073007 | 6/1993 |
| CN | 1123570 | 5/1996 |
(Continued)

OTHER PUBLICATIONS

English Translation from Espacenet for JP 5920534 A1 (Nippon Steel & Sumitomo Metal Corp (2014)).*
(Continued)

*Primary Examiner* — Mohamed K Amara
(74) *Attorney, Agent, or Firm* — Kile Park Reed & Houtteman PLLC

(57) ABSTRACT

A substrate inspection apparatus is disclosed. The substrate inspection apparatus includes: a first light source configured to radiate an ultraviolet light onto a coated film of a substrate, the coated film being mixed with fluorescent pigments; a first light detector configured to capture fluorescence generated from the coated film onto which the ultraviolet light is radiated, and to obtain a two-dimensional (2D) image of the substrate; a processor configured to derive one region among a plurality of regions of the substrate based on the 2D image; a second light source configured to radiate a laser light onto the one region; and a second light detector configured to obtain optical interference data generated from the one region by the laser light, wherein the processor is configured to derive a thickness of the coated film of the one region based on the optical interference data.

16 Claims, 10 Drawing Sheets

(51) Int. Cl.
*G01N 21/64* (2006.01)
*G01B 9/02* (2006.01)

(58) Field of Classification Search
CPC ............... G01B 11/06; G01B 9/02044; G01B 2290/70; A61B 5/0066; A61B 3/102; A61B 5/0071; G01N 21/95; G01N 21/64; G01N 21/6428; G01N 21/6458; G01N 2021/6421; G02B 21/16; G02B 21/0076; G02B 21/00
See application file for complete search history.

(56) References Cited

U.S. PATENT DOCUMENTS

| | | | |
|---|---|---|---|
| 5,657,124 A | 8/1997 | Zhang et al. | |
| 6,122,042 A * | 9/2000 | Wunderman | A61B 1/05 356/343 |
| 6,507,747 B1 | 1/2003 | Gowda et al. | |
| 6,694,284 B1 * | 2/2004 | Nikoonahad | G01N 21/211 702/155 |
| 8,395,770 B1 * | 3/2013 | Hug | G01J 3/10 356/317 |
| 9,250,186 B2 * | 2/2016 | Farahi | G01N 21/64 |
| 9,355,442 B2 * | 5/2016 | Iwanaga | H01L 21/67253 |
| 9,389,064 B2 * | 7/2016 | Liu | G01B 9/0203 |
| 9,453,725 B2 * | 9/2016 | Baath | G01B 11/303 |
| 9,494,409 B2 | 11/2016 | Schonleber et al. | |
| 9,568,418 B1 * | 2/2017 | Hug | G01N 21/64 |
| 9,588,060 B2 * | 3/2017 | Jung | G01N 21/95 |
| 9,593,939 B1 * | 3/2017 | Xie | G01B 11/0625 |
| 9,651,366 B2 * | 5/2017 | Chern | G01B 11/167 |
| 9,671,460 B2 * | 6/2017 | Wei | G01R 31/308 |
| 9,756,313 B2 * | 9/2017 | Koren | G01B 11/0608 |
| 9,958,319 B2 * | 5/2018 | Zur Nieden | G01J 1/58 |
| 2002/0029814 A1 * | 3/2002 | Unger | F15C 1/06 137/824 |
| 2002/0074553 A1 * | 6/2002 | Starikov | H01L 31/1852 257/77 |
| 2002/0107650 A1 * | 8/2002 | Wack | G01N 21/9501 702/81 |
| 2003/0090669 A1 | 5/2003 | Jung et al. | |
| 2004/0150821 A1 * | 8/2004 | Shibata | G02B 21/0016 356/369 |
| 2004/0159773 A1 * | 8/2004 | Fein | G01N 21/6458 250/208.1 |
| 2005/0153435 A1 * | 7/2005 | Archibald | G01N 21/3577 435/287.2 |
| 2006/0113544 A1 * | 6/2006 | Otsuka | G02B 6/0096 257/76 |
| 2007/0062447 A1 | 3/2007 | Hayashi et al. | |
| 2008/0062429 A1 | 3/2008 | Liang et al. | |
| 2008/0240543 A1 * | 10/2008 | Budach | G01N 21/6428 382/141 |
| 2008/0289710 A1 * | 11/2008 | Unger | B01L 3/50273 137/833 |
| 2010/0091243 A1 | 4/2010 | Bor | |
| 2012/0176623 A1 | 7/2012 | Lee et al. | |
| 2012/0188538 A1 * | 7/2012 | Patil | G01N 21/4795 356/301 |
| 2012/0320380 A1 | 12/2012 | Schönleber et al. | |
| 2013/0027516 A1 * | 1/2013 | Hart | A61B 1/0653 348/45 |
| 2014/0139840 A1 * | 5/2014 | Judkewitz | G02B 21/367 356/456 |
| 2015/0159995 A1 | 6/2015 | Tixier et al. | |
| 2015/0226537 A1 | 8/2015 | Schorre et al. | |
| 2015/0294468 A1 | 10/2015 | Shimizu et al. | |
| 2017/0027439 A1 | 2/2017 | Shimizu et al. | |
| 2017/0077348 A1 * | 3/2017 | Lim | H01L 33/44 |
| 2017/0131087 A1 | 5/2017 | Tixier et al. | |
| 2017/0224219 A1 | 8/2017 | Hirayama et al. | |
| 2017/0284791 A1 | 10/2017 | Jing et al. | |
| 2018/0113326 A1 | 4/2018 | Gloege et al. | |
| 2018/0195855 A1 | 7/2018 | Liu et al. | |
| 2018/0195961 A1 * | 7/2018 | Earney | G01N 21/643 |
| 2019/0058242 A1 * | 2/2019 | Tabe | H01Q 21/28 |
| 2019/0162522 A1 * | 5/2019 | Hong | G01B 9/02091 |
| 2019/0162523 A1 * | 5/2019 | Hong | G01B 9/02091 |

FOREIGN PATENT DOCUMENTS

| | | |
|---|---|---|
| CN | 1414377 | 4/2003 |
| CN | 1924517 | 3/2007 |
| CN | 106017337 | 10/2016 |
| CN | 106104199 | 11/2016 |
| CN | 209399935 | 9/2019 |
| EP | 2 535 680 | 12/2012 |
| JP | 61-212705 | 9/1986 |
| JP | 62-011106 | 1/1987 |
| JP | 64-9449 | 1/1989 |
| JP | 03-252512 | 11/1991 |
| JP | 8-309262 | 11/1996 |
| JP | 2007-198771 | 8/2007 |
| JP | 2010-281580 | 12/2010 |
| JP | 2013-205253 | 10/2013 |
| JP | 2014-100230 | 6/2014 |
| KR | 10-2014-0133992 | 11/2014 |
| KR | 10-2017-0085279 | 7/2017 |
| TW | 201305528 | 2/2013 |
| WO | 2014/192734 | 12/2014 |
| WO | 2016/067570 | 5/2016 |

OTHER PUBLICATIONS

Extended European Search Report for European Application No. 18208781.7; dated Mar. 7, 2019.
Extended European Search Report for European Application No. 18208784.1; dated Mar. 7, 2019.
Korean Office Action for Korean Application No. 10-2018-0136165, with English translation, dated Sep. 30, 2019.
Korean Office Action for Korean Application No. 10-2018-0136170, with English translation, dated Sep. 30, 2019.
Japanese Office Action for Japanese Application No. 2018-222330, with English translation, dated Nov. 5, 2019.
Japanese Office Action for Japanese Application No. 2018-222331, with English translation, dated Nov. 5, 2019.
Korean Office Action, with English translation, corresponding to Korean Application No. 10-2018-0136170, dated Apr. 28, 2020.
United States Office Action corresponding to U.S. Appl. No. 16/202,543, dated Mar. 23, 2020.
Chinese Office Application, with English translation, corresponding to Chinese Application No. or Publication No. 201811433244.3, dated Jun. 19, 2020.
Chinese Office Application, with English translation, corresponding to Chinese Application No. or Publication No. 201811434729.4, dated Jun. 11, 2020.

* cited by examiner

FIG. 9
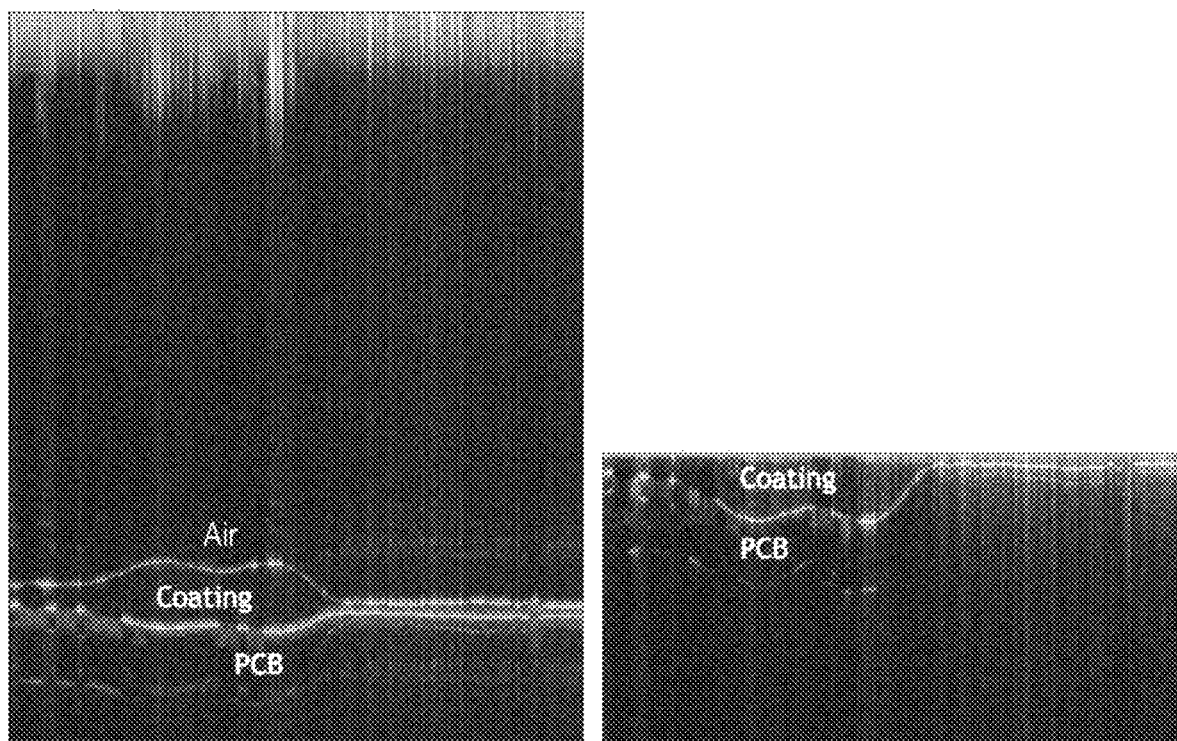
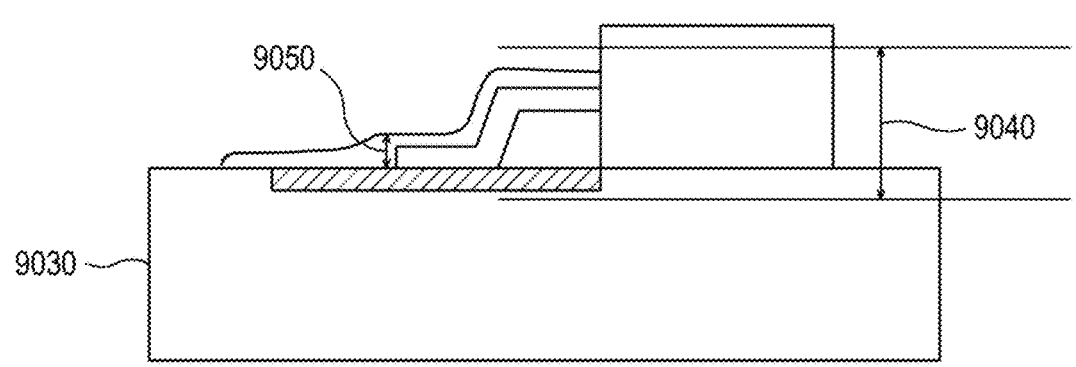

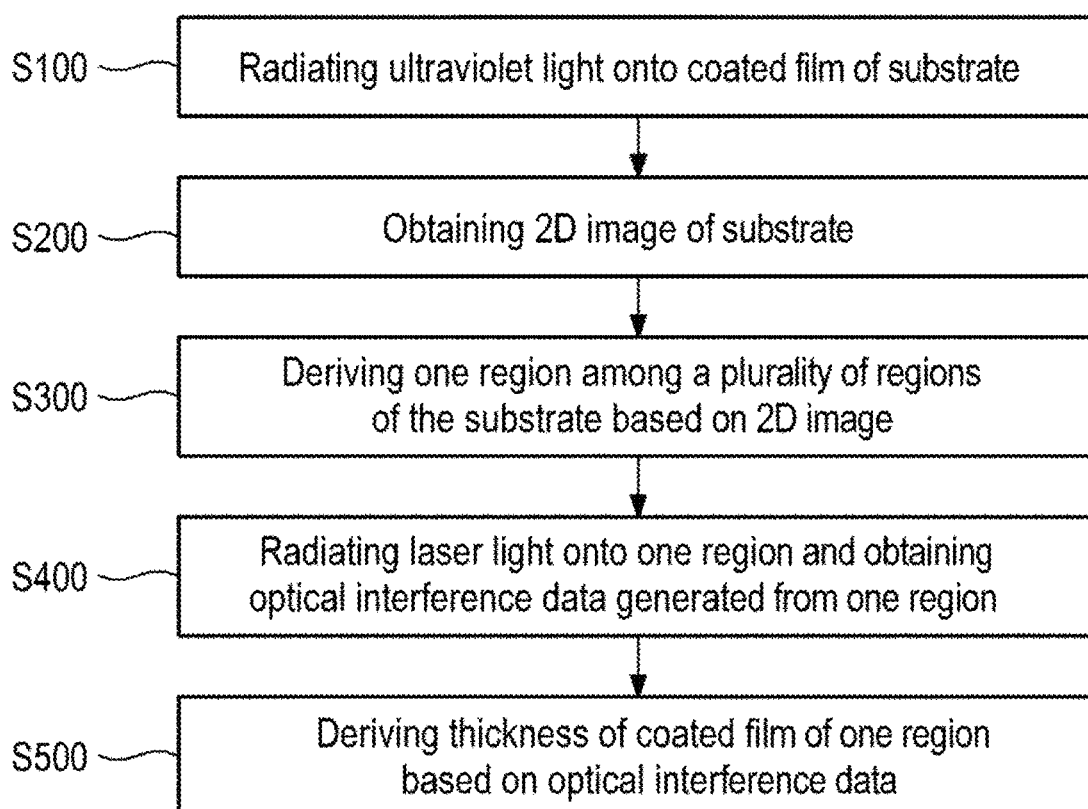

APPARATUS FOR INSPECTING SUBSTRATE AND METHOD THEREOF

CROSS-REFERENCE TO RELATED APPLICATION(S)

The present application claims priority from Korean Patent Application Nos. 10-2017-0160680 (filed on Nov. 28, 2017) and 10-2018-0136165 (filed on Nov. 7, 2018), the entire subject matters of which are incorporated herein by reference.

TECHNICAL FIELD

The present disclosure relates to a substrate inspection apparatus and a substrate inspection method.

BACKGROUND

In a substrate-processing process, a substrate may be coated in order to protect elements on the substrate. The coating process is referred to as conformal coating. The thickness of a conformal coated film may be inspected in order to check whether the coated film formed on the substrate by coating is evenly coated to have a certain thickness.

For inspecting a thickness of the coated film, a two-dimensional (2D) photographic inspection may be performed. The 2D photographic inspection may inspect an object by obtaining a 2D image of the object, and 2D fluorescent photographic inspection may be included therein. The 2D photographic inspection performs only qualitative inspection on the thickness of the coated film, and may not accurately measure the thickness of the coated film. Also, it may be difficult to use 2D photographic inspection to measure a thickness when the coated film is thin (e.g., about 30 μm).

Further, in order to inspect the thickness of the coated film, a confocal microscope may be used. However, it takes a long time to measure the thickness of the coated film using the confocal microscope. Also, in order to inspect the thickness of the coated film, the thickness may be measured using optical coherence tomography (OCT). However, the measurement using OCT is limited in improving both a depth resolution and a depth measurement range. Saturation due to the light used in OCT may occur at an electrode part of elements on the substrate, and thus accurate measurement may be difficult.

SUMMARY

Some embodiments of the present disclosure provide a technology for measuring a thickness of a coated film of a substrate.

In accordance with an aspect of the present disclosure, there is provided a substrate inspection apparatus. The substrate inspection apparatus according to an aspect of the present disclosure may include: a first light source configured to radiate an ultraviolet light onto a coated film of a substrate, the coated film being mixed with fluorescent pigments; a first light detector configured to capture fluorescence generated from the coated film onto which the ultraviolet light is radiated, and to obtain a two-dimensional (2D) image of the substrate; a processor configured to derive one region among a plurality of regions of the substrate based on the 2D image; a second light source configured to radiate a laser light onto the one region; and a second light detector configured to obtain optical interference data generated from the one region by the laser light, wherein the processor may be configured to derive a thickness of the coated film of the one region based on the optical interference data.

According to an embodiment, the processor may be configured to derive an amount of spread of the coated film for each of the plurality of regions based on the 2D image; and to determine, as the one region, a region of which the amount of spread is less than or equal to a predetermined amount of spread from among the plurality of regions.

According to an embodiment, the substrate inspection apparatus may further include a memory storing information about a region of interest predetermined by a user, wherein the processor may be configured to determine the one region based on the information about the region of interest.

According to an embodiment, the region of interest may be a region including electrodes of elements on the substrate.

According to an embodiment, the processor may be configured to determine, as the one region, a region which is identified as a region including a defect on the substrate based on the 2D image.

According to an embodiment, the memory may further store element arrangement information indicating arrangement of the elements on the substrate, and the processor may be configured to derive a region including the electrodes using the element arrangement information.

According to an embodiment, a reflected light which is reflected from a surface of the coated film may be used as a reference light.

According to an embodiment, the processor may be configured to obtain a sectional image showing a section cut in a first axial direction corresponding to a depth direction of the coated film, based on the optical interference data; and to determine the thickness of the coated film of the one region based on a boundary line in the sectional image.

According to an embodiment, a reflectivity of the surface of the coated film with respect to the laser light may be determined based on a fluorescent pigment mixing ratio of the coated film with which the fluorescent pigments are mixed, and the fluorescent pigment mixing ratio may be set to a value that enables the reflectivity to exceed a predetermined reference value.

According to an embodiment, the coated film may be formed of at least one material selected from among acrylic, urethane, polyurethane, silicone, epoxy, an ultraviolet (UV) curable material, and an infrared (IR) curable material.

According to an embodiment, the surface of the coated film may be formed to be a curved surface.

In accordance with an aspect of the present disclosure, there is provided a substrate inspection method. The substrate inspection method according to an aspect of the present disclosure may include the steps of: radiating an ultraviolet light onto a coated film of a substrate, the coated film being mixed with fluorescent pigments; obtaining a 2D image of the substrate by capturing fluorescence generated from the coated film onto which the ultraviolet light is radiated; deriving one region from among a plurality of regions of the substrate based on the 2D image; radiating a laser light onto the one region and obtaining optical interference data generated from the one region by the laser light; and deriving a thickness of the coated film of the one region based on the optical interference data.

According to an embodiment, the step of deriving the one region may include: deriving an amount of spread of the coated film for each of the plurality of regions based on the 2D image; and determining, as the one region, a region of which the amount of spread is less than or equal to a predetermined amount of spread from among the plurality of regions.

According to an embodiment, the step of deriving the one region may include determining the one region based on information about a region of interest predetermined by a user.

According to an embodiment, the region of interest may be a region including electrodes of elements on the substrate.

According to an embodiment, the step of deriving the one region may include determining, as the one region, a region which is identified as a region including a defect on the substrate based on the two-dimensional image.

According to an embodiment, the region including the electrodes may be derived based on element arrangement information indicating arrangement of the elements on the substrate.

According to an embodiment, a reflected light which is reflected from a surface of the coated film may be used as a reference light.

According to an embodiment, the step of deriving the thickness of the coated film of the one region may include: obtaining a sectional image showing a section cut in a first axial direction corresponding to a depth direction of the coated film, based on the optical interference data; and determining the thickness of the coated film of the one region based on a boundary line in the sectional image.

According to an embodiment, a reflectivity of the surface of the coated film with respect to the laser light may be determined based on a fluorescent pigment mixing ratio of the coated film with which the fluorescent pigments are mixed, and the fluorescent pigment mixing ratio may be set to a value that enables the reflectivity to exceed a predetermined reference value.

According to an embodiment, the coated film may be formed of at least one material selected from among acrylic, urethane, polyurethane, silicone, epoxy, an UV curable material, and an IR curable material.

According to an embodiment, the surface of the coated film may be formed to be a curved surface.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

FIG. 9 is a diagram illustrating measurement ranges of the first OCT part and the second OCT part according to an embodiment of the present disclosure.

FIG. 10 is a diagram illustrating an embodiment of a substrate inspection method, which may be performed by an inspection apparatus according to the present disclosure.

DETAILED DESCRIPTION

Figure 1:
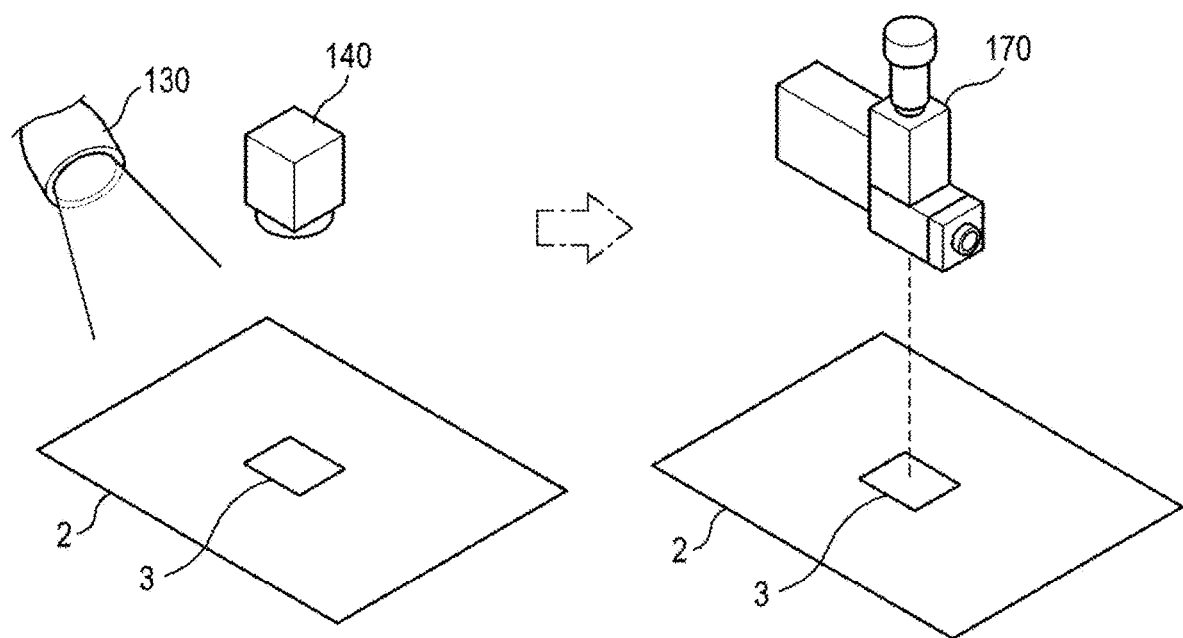
FIG. 1 is a diagram illustrating an embodiment of a process in which a substrate inspection apparatus according to the present disclosure operates.

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments. Various embodiments disclosed in the present document are illustrated for the purpose of accurate description of the technical idea of the present disclosure, which should not be construed to be limited to a predetermined embodiment. The technical idea of the present disclosure may include various modifications, equivalents, alternatives of the embodiments provided in the present document, and may include a combination of embodiments selected from some or all of the embodiments. Also, the scope of rights of the technical idea of the present disclosure is not limited to various embodiments provided below or to the detailed descriptions thereof.

The terms used in the present document, including technical or scientific terms, have meanings which are generally understood by those skilled in the art that the present disclosure belongs to, unless otherwise defined.

The expressions such as "comprise", "may comprise", "include", "may include", "have", "may have", and the like, used in the present document, indicate that a feature (e.g., a function, an operation, an element, or the like), which is the object of the expression, exists, and do not exclude other additional features. That is, the expressions should be understood as open-ended terms including the possibility that another embodiment exists.

In the present document, an expression in the singular form may include the meaning of the plural form, unless otherwise specified, and this will be equally applied to an expression in the singular form included in the claims.

The expressions such as "$1^{st}$", "$2^{nd}$", "first", "second", and the like, used in the present document are used to distinguish one object from another object when designating a plurality of objects of the same kind, unless otherwise specified, and the expressions may not define the order of the objects or the importance of the objects.

The expressions such as "A, B, and C", "A, B, or C", "A, B, and/or C", "at least one of A, B, and C", "at least one of A, B, or C", "at least one of A, B, and/or C", and the like indicate listed items or all possible combinations of listed items. For example, "at least one of A or B" indicates (1) at least one A, (2) at least one B, or (3) at least one A and at least one B.

The expression "based on" used in the present document is used to describe one or more factors that affect determination, an operation of making a decision, or an operation described in a phrase or a sentence including the corresponding expression, and the expression does not exclude additional factors that affect the corresponding determination, the operation of making a decision, or the other operation.

In the present document, the expression "an element (e.g., a first element) is connected or accessed to another element (e.g., a second element)" may indicate that the element is directly connected or linked to the other element, or may indicate that the element is connected or linked to the other element using a new element (e.g., a third element) as a medium.

The expression "configured to" used in the present document may include meanings, such as "set to", "has an ability to", "changed so as to", "made to", "able to", and the like. The expression is not limited to "designed specially in terms of hardware." For example, a processor configured to perform a predetermined operation may be a general-purpose processor that is capable of performing the predetermined operation by executing software.

To describe various embodiments of the present disclosure, an orthogonal coordinate system may be defined, the system including the x-axis, the y-axis, and the z-axis, which are orthogonal to each other. The expressions used in the present document, such as "x-axis direction", "y-axis direction", "z-axis direction", and the like in association with the orthogonal coordinate system, may indicate both directions in which each axis in the orthogonal coordinate system extends, unless otherwise specified. Also, the "+" sign put in front of the direction of each axis indicates the positive direction, which is one of the directions in which the corresponding axis extends. The "−" sign put in front of the direction of each axis indicates the negative direction, which is the other of the directions in which the corresponding axis extends.

In the present disclosure, a substrate is a board or a container in which elements such as a semiconductor chip and the like are installed, and the substrate may act as a passageway of electric signals among elements. The substrate may be used to manufacture an integrated circuit or the like, and may be formed of a material such as silicone or the like. For example, the substrate may be a printed circuit board (PCB), and may be referred to as a wafer or the like depending on the embodiment.

In the present disclosure, a coated film may be a thin film, which is generated on the substrate by coating in order to protect the elements installed on the substrate. When the coated film is thick, the film may be broken and may affect the operation of the substrate. Accordingly, the coated film needs to be coated relatively thinly and evenly in order to prevent the coated film from breaking. According to an embodiment, the coated film may be formed of at least one material selected from among acrylic, urethane, polyurethane, silicone, epoxy, an ultraviolet (UV) curable material, and an infrared (IR) curable material. In the case of the coated film formed of at least one of the above-described materials, the reflectivity of the surface of the coated film and/or the backscattering ratio of the coated film may be higher than those of other coated films.

In the present disclosure, an optical coherence tomography (OCT) is an imaging technology that captures an image of the inside of an object using optical interference. Using the OCT, an image showing the inside of an object in the depth direction from the surface of the object may be obtained. Generally, the OCT is based on an interferometer. The depth resolution with respect to the object may be different depending on the wavelength of the light that is used. The OCT may obtain an image by more deeply penetrating the object than a confocal microscope, which is another optical technology.

Hereinafter, various embodiments of the present disclosure will be described with reference to attached drawings. In the drawings and descriptions of the drawings, the same or substantially equivalent elements may be assigned the same reference numeral. Also, in various embodiments described below, overlapping descriptions of the same elements or corresponding elements may be omitted. However, this does not mean that an element for which a description is omitted is not included in the corresponding embodiment.

FIG. 1 is a diagram illustrating an embodiment of the process by which a substrate inspection apparatus according to the present disclosure operates. The substrate inspection apparatus according to the present disclosure may be implemented by an inspection apparatus 10 according to various embodiments. The inspection apparatus 10 according to various embodiments of the present disclosure may measure the thickness of a coated film spread on a substrate. According to an embodiment, the inspection apparatus 10 may perform photographic inspection of the entirety of the substrate, using fluorescent pigments, may derive a predetermined region based on a predetermined reference, and may additionally measure the thickness of the derived region using the OCT.

First, the inspection apparatus 10 may perform the photographic inspection of a substrate 2 using fluorescent pigments. The photographic inspection may be a fluorescent photographic inspection. To this end, the coated film to be spread on the substrate 2 may be mixed with fluorescent pigments in advance. A first light source 130 of the inspection apparatus 10 may radiate ultraviolet light onto the coated film of the substrate. The radiated ultraviolet light may excite fluorescent pigments mixed in the coated film so as to generate fluorescence. A first light detector 140 of the inspection apparatus 10 may capture the fluorescence and obtain a two-dimensional (2D) image of the coated film of the substrate 2. The 2D image may be a 2D fluorescent image, depending on the embodiment.

The inspection apparatus 10 may derive one or more regions 3 of the substrate 2 according to a predetermined reference based on the result of the photographic inspection. According to an embodiment, the inspection apparatus 10 may derive the amount of spread of the coated film for each region of the substrate 2, from the 2D image, and may derive a predetermined region 3 based on the derived amount of spread. According to an embodiment, the 2D image may show an element installed on the substrate 2 and features or defects of the element on the substrate that were generated in the course of performing various processes. The inspection apparatus 10 may derive the predetermined region 3 based thereon.

Subsequently, the inspection apparatus 10 may additionally measure the thickness of the derived region 3 using the OCT. An OCT part 170 of the inspection apparatus 10 may obtain optical interference data about the derived region 3, and may additionally measure the thickness of the coated film spread on the corresponding region 3 on the substrate based on the obtained optical interference data.

According to an embodiment, the inspection apparatus 10 may derive, from the 2D image, an important region, which needs to be protected with the coated film, on the substrate 2. The important region that needs to be protected with the coated film may be, for example, a region including the electrode part of a component. The important region may be derived by comparing information stored in advance on a memory with the 2D image. The inspection apparatus 10 may additionally measure the thickness of the derived important region using the OCT.

According to an embodiment, the inspection apparatus 10 may measure the thickness of a region of interest predetermined by a user using the OCT part 170. The memory of the inspection apparatus 10 may store information about the region of interest predetermined by the user. Based on the information, a processor of the inspection apparatus 10 may determine a region corresponding to the region of interest as a region of which the thickness is to be measured using the OCT. According to an embodiment, the region of interest may be a region including the electrode part of a component or an element as described above. According to an embodiment, the process of deriving a part corresponding to the region of interest may be performed using the 2D image of the substrate.

In the present disclosure, the optical interference data may indicate data obtained from interference light that is generated by interference between measurement light and reference light in the object measurement according to the OCT. The measurement light is the light that is radiated and reflected from the object, and the reference light is the light that is radiated and is reflected from a reference mirror or the like. An interference phenomenon may occur by a difference in the features (optical path, wavelength, or the like) of the measurement light and the reference light; a light detector may capture the interference phenomenon and may obtain the optical interference data. Also, based on the optical interference data, a sectional image showing a section cut in the depth direction of the coated film may be generated. The optical interference data may also be referred to as an interference signal.

According to various embodiments of the present disclosure, the inspection apparatus 10 may accurately measure the thickness of the coated film using the OCT part 170. Also, even when the thickness of the coated film is less than or equal to, for example, about 30 μm, the inspection apparatus 10 is capable of measuring the thickness of the coated film.

According to various embodiments of the present disclosure, the inspection apparatus 10 may derive the amount of spread of the coated film for each region of the substrate 2 from the 2D image of the substrate 2, may sample a predetermined region according to a predetermined reference, and may additionally measure the thickness of the predetermined region using the OCT part 170. Therefore, the inspection apparatus 10 may be capable of accurately measuring the thickness, unlike the 2D photographic inspection, and may also be capable of reducing the amount of time spent for measurement when compared to the amount of time spent measuring the thickness of the coated film of the entire substrate using the OCT.

Figure 2:
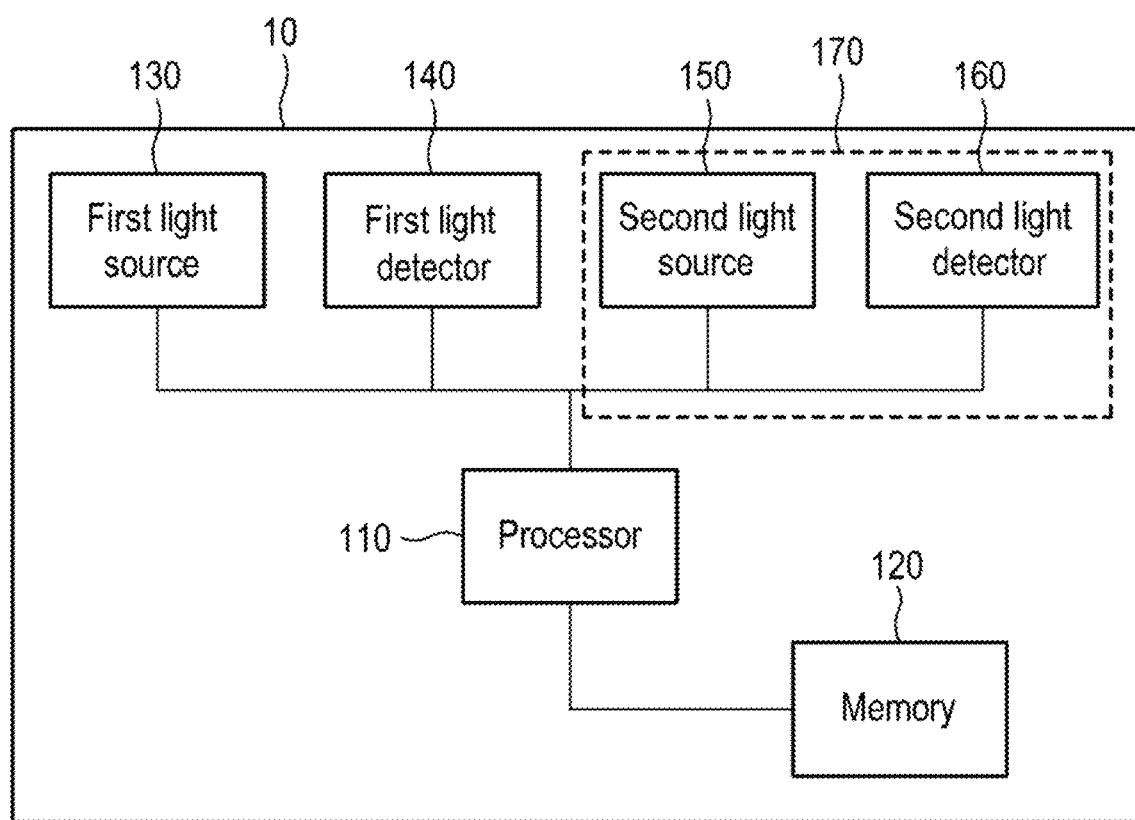
FIG. 2 is a block diagram illustrating an inspection apparatus according to various embodiments of the present disclosure.

FIG. 2 is a block diagram of the inspection apparatus 10 according to various embodiments of the present disclosure. The substrate inspection apparatus according to the present disclosure may be implemented as the inspection apparatus 10. According to an embodiment, the inspection apparatus 10 may include the first light source 130, the first light detector 140, a second light source 150, a second light detector 160, a processor 110, and/or a memory 120. According to an embodiment, at least one of the elements of the inspection apparatus 10 may be omitted, or other elements may be further added to the inspection apparatus 10. According to an embodiment, additionally or alternatively, some of the elements may be implemented so as to be integrated, or may be implemented as a single or a plurality of entities.

At least some of the elements disposed in the interior or the exterior of the inspection apparatus 10 may be connected via a bus, a general purpose input/output (GPIO) interface, a serial peripheral interface (SPI), or a mobile industry processor interface (MIN), or the like, and may exchange data and/or signals therebetween.

The first light source 130 may radiate the ultraviolet light onto the coated film of the substrate 2, the coated film being mixed with fluorescent pigment. The first light source 130 may be disposed so as to radiate the ultraviolet light onto the substrate. The relative position of the first light source 130 on the substrate, the radiation angle of the ultraviolet light, the brightness of the ultraviolet light, and the like may be variously configured. According to an embodiment, the inspection apparatus 10 may include a plurality of first light sources 130.

The first light detector 140 may capture fluorescence generated from the coated film of the substrate 2 by the radiated ultraviolet light. Particularly, when the fluorescent pigments mixed in the coated film are excited by the radiated ultraviolet light, fluorescence may be generated. The first light detector 140 may capture the fluorescence and may obtain a 2D image of the coated film of the substrate 2. According to an embodiment, the inspection apparatus 10 may include a plurality of first light detectors 140. The first light detector 140 may be implemented as a charge-coupled device (CCD) or a complementary metal-oxide-semiconductor (CMOS).

The processor 110 may control at least one element of the inspection apparatus 10 connected to the processor 110 by driving software (e.g., a program). Also, the processor 110 may perform various operations, processing, data generation, and other processes in association with the present disclosure. Further, the processor 110 may load data or the like from the memory 120, or may store data or the like in the memory 120.

The processor 110 may derive one region among a plurality of regions of the substrate 2 based on the 2D image obtained by the first light detector 140. The one region may be derived based on a predetermined reference. The substrate 2 may be divided into a plurality of regions. The plurality of regions may be regions for virtually dividing the surface of the substrate 2, which may be divided in advance based on a predetermined reference.

According to an embodiment, the processor 110 may derive the amount of spread of the coated film for each of the plurality of regions of the substrate 2, and may derive the above-described one region based on the amount of spread Particularly, the processor 110 may obtain luminance information for each of the plurality of regions of the substrate 2 from the obtained 2D image. In the present disclosure, the luminance may indicate the intensity of light per unit area of a light source or a surface that reflects light, that is, the amount of light emitted per unit area. The luminance information of one region may be information indicating the luminance of the fluorescence generated from the region. The processor 110 may derive the amount of spread of the coated film for each of the plurality of areas of the substrate 2 based on the obtained luminance information. The coated film of the substrate 2 may include features, such as unevenness, a curve, or the like, depending on elements existing on the substrate 2, a predetermined feature or defect on the substrate 2, or the degree of evenness of the coated film. According to the features of the substrate 2, such as the unevenness, the curve or the like, the amount of fluorescent pigments spread on each region of the coated film may be different. When the ultraviolet light is radiated, the luminance of each region of the coated film may be different depending on the amount of fluorescent pigments. The processor 110 may derive the amount of spread of the coated film for each region using the luminance of each region. The processor 110 may derive a region (e.g., a first region), of which the amount of spread of the coated film is less than or equal to a predetermined amount of spread, from among the plurality of regions of the substrate 2. The predetermined amount of spread may be determined based on the intention of a designer, and the information thereon may be stored on the memory 120.

The processor 110 may measure the thickness of the coated film of the derived region (e.g., the first region) by controlling the OCT part 170. The processor 110 may obtain optical interference data (e.g., first optical interference data) associated with interference light generated from the derived region (e.g., the first region). The processor 110 may derive the thickness of the coated film of the derived region (e.g., the first region) using the obtained optical interference data (e.g., the first optical interference data).

The OCT part 170 may include the second light source 150 and/or the second light detector 160. Particularly, the processor 110 may perform the above-described operation by controlling the second light source 150 and the second light detector 160. The OCT part 170 may be implemented as one of the various types described below.

The second light source 150 may radiate laser light onto the coated film of the substrate 2. The disposition of the second light source 150, the relative position of the second light source 150 on the substrate and the like may be variously configured, and may be differently configured depending on the type of the OCT part 170. According to an embodiment, the second light source 150 may use a laser of which the wavelength is variable within a short time, whereby optical interference data corresponding to different wavelengths may be obtained using the same. According to an embodiment, the inspection apparatus 10 may include a plurality of second light sources 150. The second light source 150 may be controlled by the processor 110 and may radiate laser light onto the above-described derived region (e.g., the first region or the like).

The second light detector 160 may capture interference light generated from the coated film by the laser light. Particularly, when a first OCT part, which will be described below, is used, the second light detector 160 may capture the interference light generated by reflected light (reference light), which is laser light reflected from a reference mirror, and measurement light reflected from the coated film. A section image for a reference mirror surface may be generated using the optical interference data obtained by capturing the interference light. When a second OCT part, which will be described below, is used according to an embodiment, the second light detector 160 may capture the interference light generated by the reflected light and the scattered light. The reflected light is the laser light reflected from the surface of the coated film, and the scattered light is the laser light that penetrates the coated film to a predetermined depth and is backscattered. Here, the reflected light that is reflected from the surface of the coated film acts as reference light, and the scattered light acts as measurement light. A section image based on a coated film surface may be generated using the optical interference data obtained by capturing the interference light. According to an embodiment, the inspection apparatus 10 may include a plurality of second light detectors 160. The second light detector 160 may be implemented as the CCD or the CMOS. The second light detector 160 may be controlled by the processor 110 and may obtain the optical interference data (e.g., the first optical interference data or the like) associated with reference light generated from the above-described derived region (e.g., the first region or the like) by the laser light.

The memory 120 may store various data. The data stored on the memory 120 may be data obtained, processed, or used by at least one element of the inspection apparatus 10, and may include software (e.g., a program). The memory 120 may include a transitory memory and/or a non-transitory memory. The memory 120 may store data obtained from the first light detector 140 and the second light detector 160. Also, the memory 120 may store the luminance information of each region of the substrate 2, derived from the 2D image, and/or coated film thickness information derived by the processor 110. Further, the memory 120 may store, in advance, element arrangement information 1000, element density information 2000, features of elements on a substrate, information about a defective region, electrode position information 3000 about the position of an electrode on a substrate, information about the region of interest set in advance by a user, and the like.

In the present disclosure, the element arrangement information 1000 may be information indicating the arrangement of elements disposed on the substrate 2. The element arrangement information 1000 may indicate information about positions and orientations of the elements installed on the substrate 2 and the areas occupied thereby. The element arrangement information 1000 may be used as a basis to adjust the above-described luminance information or to specify a predetermined region on the substrate. According to an embodiment, the inspection apparatus 10 may derive the amount of spread of the coated film for each of the plurality of regions of the substrate, based on the element arrangement information and the 2D image.

In the present disclosure, the element density information 2000 may be information indicating the density of the elements disposed on the substrate 2. The element density information 2000 may indicate the density of elements or the like in each region of the substrate 2 by taking into consideration the ratio of the area that an object occupies to a unit area, such an object including an element, the electrode of an element, a solder ball, a metallic wire, a lead frame, and the like. The element density information 2000 may be derived based on the element arrangement information 1000.

In the present disclosure, a program may be software stored on the memory, and may include an operating system for controlling resources of the inspection apparatus, applications, and/or middleware that provides various functions to the applications such that the applications utilize the resources of the inspection apparatus.

According to an embodiment, the inspection apparatus 10 may further include a communication interface (not illustrated). The communication interface may enable wired or wireless communication between the inspection apparatus 10 and other servers or between the inspection apparatus 10 and an external electronic device. For example, the communication interface may perform the wireless communication based on long-term evolution (LIE), LTE Advanced (LIE-A), code division multiple access (CDMA), wideband CDMA (WCDMA), wireless broadband (WiBro), Wi-Fi, Bluetooth, nearfield communication (NFC), global positioning system (GPS) or global navigation satellite system (GNSS), or the like. For example, the communication interface may perform the wired communication based on a universal serial bus (USB), a high-definition multimedia interface (HDMI), recommended standard 232 (RS-232), a plain old telephone service (POTS), or the like.

According to an embodiment, the processor 110 may obtain information from a server by controlling the communication interface. The information obtained from the server may be stored on the memory 120. According to an embodiment, the information obtained from the server may include the element arrangement information 1000, the element density information 2000, the features of elements on the substrate, the information about the defective region, the electrode position information 3000 about the position of an electrode on a substrate, the information about the region of interest set in advance by a user, and the like.

According to an embodiment, the inspection apparatus 10 may further include an input device (not illustrated). The input device may be a device that receives, from the outside, data which is to be transferred to at least one element of the inspection apparatus 10. The input device may receive, from a user, information about the region of interest. For example, the input device may include a mouse, a keyboard, a touch pad, or the like.

According to an embodiment, the inspection apparatus 10 may further include an output device (not illustrated). The output device may be a device that provides various data, such as an inspection result, an operation state, and the like of the inspection apparatus 10 to a user in a visual form. For example, the output device may include a display, a projector, a hologram, or the like.

According to an embodiment, the inspection apparatus 10 may be provided in one of the various types of devices. For example, the inspection apparatus may be a portable communication device, a computer device, a portable multimedia device, or a wearable device, or may be a combination of one or more of the above-described devices. The inspection apparatus of the present disclosure is not limited to the above-described devices.

Various embodiments of the inspection apparatus 10 according to the present disclosure may be applied in combination. Many combinations of the embodiments as the possible number of cases may exist, and the embodiments of the inspection apparatus 10 resulting from such combination may also be included in the scope of the present disclosure. Also, the elements disposed in the interior or the exterior of the inspection apparatus 10 according to the present disclosure may be added, modified, replaced, or removed depending on the embodiment. Also, the elements disposed in the interior or the exterior of the inspection apparatus 10 may be implemented as hardware components.

Figure 3:
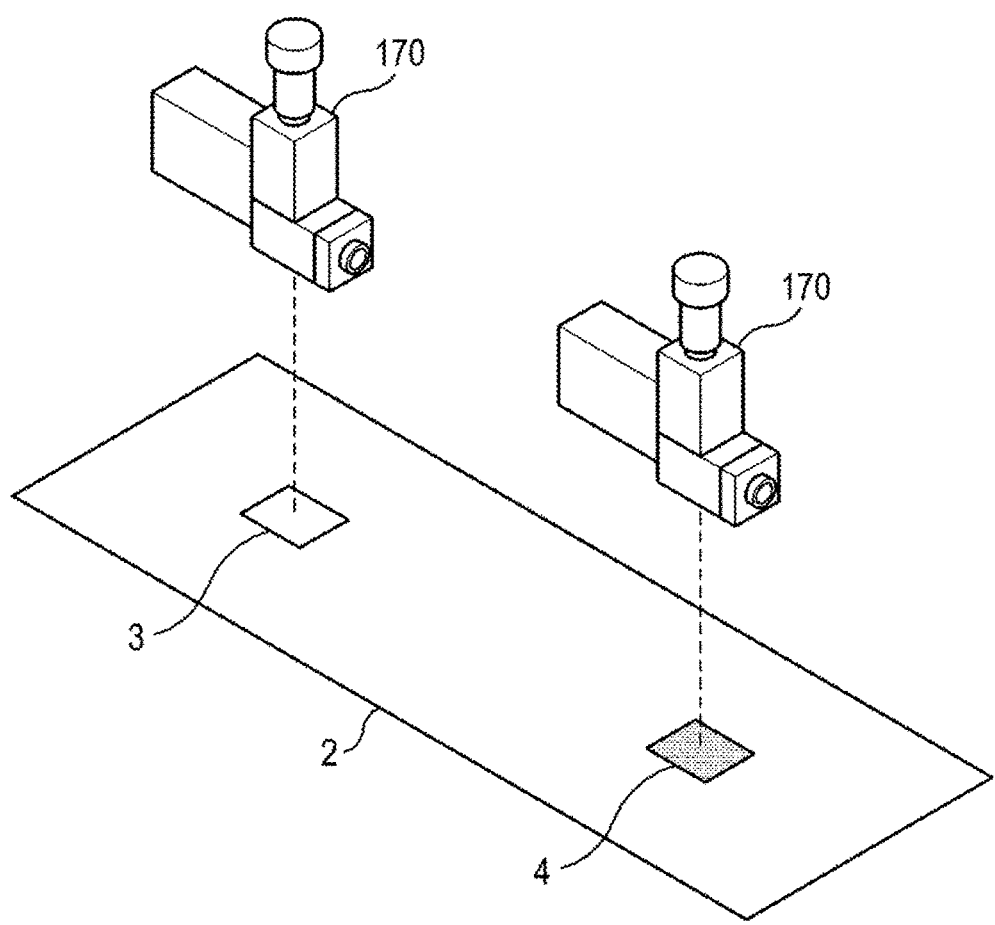
FIG. 3 is a diagram illustrating a process in which an inspection apparatus derives an optical coherence tomography (OCT) measurement target region based on an element arrangement, according to an embodiment of the present disclosure.

FIG. 3 is a diagram illustrating a process in which the inspection apparatus 10 derives an OCT measurement target region based on element arrangement according to an embodiment of the present disclosure. According to an embodiment, the processor 110 may derive a region (e.g., a second region), of which the arrangement of elements is the same as, or similar to, that of a region (e.g., a first region) of which the amount of spread derived from a 2D image is less than or equal to a predetermined amount of spread. Further, the processor 110 may derive the thickness of the derived region (e.g., the second region) by controlling the OCT part 170. In other words, the processor 110 may derive a region having the same or similar element arrangement based on the element arrangement information 1000, and may measure the thickness of the region using the OCT.

The region having the same or similar element arrangement may have a thickness similar to that of a coated film. When it is determined that the amount of spread on one region is less than or equal to a predetermined amount of spread via inspection using a 2D image, another region that has an element arrangement the same as or similar to that of the one region may have an amount of spread of the coated film that is similar to that of the one region. Accordingly, in order to improve the accuracy of the entire coated film thickness inspection, the inspection apparatus 10 may further perform an operation according to the present embodiment.

The processor 110 may derive a region 3 (e.g., the first region) of which the amount of spread obtained via the 2D image is less than or equal to a predetermined amount of spread, as described above. According to an embodiment, the processor 110 may measure the thickness of the region 3 using the OCT part 170.

In addition, the processor 110 may derive a region 4 that has the same element arrangement as that of the derived region 3 on the substrate 2. The region 4 (e.g., the second region) may be selected from among regions (regions excluding the first region) of which the amount of spread derived from the 2D image exceeds the predetermined amount of spread. The processor 110 may derive the corresponding region 4 based on the above-described element arrangement information 1000.

The processor 110 may derive the thickness of the additionally derived region 4 using the OCT part 170. The processor 110 may control the second light source 150 and the second light detector 160 so as to obtain optical interference data (e.g., second optical interference data) generated by laser light reflected from the corresponding region 4. The processor 110 may derive the thickness of the coated film spread on the region 4 based on the obtained optical interference data. In the present disclosure, the fact that the processor 110 obtains optical interference data of one region by controlling the second light source 150 and the second light detector 160 may indicate that the second light source 150 radiates laser light onto the corresponding one region and that the second light detector 160 obtains optical interference data associated with interference light generated from the one region.

According to an embodiment, the processor 110 may derive the region 4, of which the element arrangement is similar to that of the region 3 derived from the 2D image. Further, the processor 110 may measure the thickness of the region 4 using the OCT. Here, whether the element arrangements of the two regions 3 and 4 are similar to each other may be determined based on the element arrangement information 1000 about the two regions 3 and 4. The processor 110 may calculate the similarity of the element arrangements of the two regions based on the areas that the elements occupy in the regions 3 and 4, the arrangements, the type, and the form of the elements, the positions of electrodes of the elements, or the like. Further, the processor 110 may determine whether the element arrangements of the two regions are similar to each other based on the calculated similarity.

According to an embodiment, the processor 110 may adjust the above-described luminance information based on the density of elements and an element arrangement on the substrate 2, and may derive the amount of spread of the coated film of a corresponding region based on the adjusted luminance information. Particularly, the processor 110 may obtain the element arrangement information 1000 indicating the arrangement of elements on the substrate 2 from the memory 120. The processor 110 may derive the element density information 2000 about each region on the substrate 2 based on the above-described element arrangement information 1000. The processor 110 may adjust luminance information derived from the 2D image based on the element density information 2000. The fluorescent pigments may not be evenly spread on a region having a high element density in the substrate 2. In regions with a high element density, that is, regions in which elements are densely disposed, fluorescent pigments may be accumulated, and thus luminance may be measured to be high. The processor 110 may adjust the obtained luminance information by taking into consideration luminance distortion by the element density. To adjust the luminance information, accumulated information indicating the relationship between element density and luminance may be used. The information may be collected in a database and may be stored on the memory 120. The processor 110 may derive the amount of spread on each region of the substrate 2 based on the adjusted luminance information.

Figure 4:
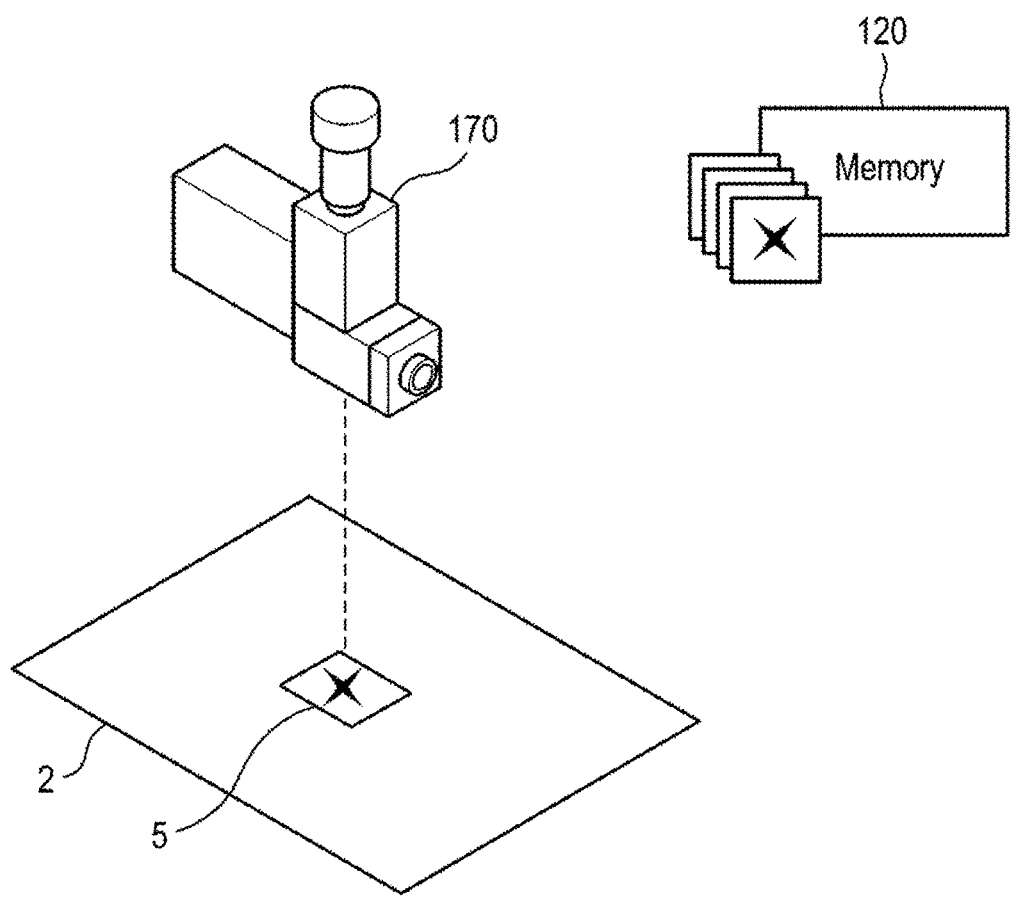
FIG. 4 is a diagram illustrating a process in which an inspection apparatus derives the OCT measurement target region based on a defective region, according to an embodiment of the present disclosure.

FIG. 4 is a diagram illustrating the process by which the inspection apparatus 10 derives an OCT measurement target region based on a defective region, according to an embodiment of the present disclosure. According to an embodiment, the processor 110 may derive a region 5 (e.g., a third region), which is determined as a region having a defect on the substrate 2 based on the element arrangement information 1000 and/or the 2D image, and may derive the thickness of the region 5 (e.g., the third region) by controlling the OCT part 170.

When the amount of spread on a part including a predetermined defect on the substrate 2 or a coated film, for example, a part including a crack, an exfoliation, an unevenness, a curve or the like, is measured via 2D photographic inspection, the result may include an error. Accordingly, the thickness of the coated film of the region 5, which is determined to be a region including a predetermined defect based on the element arrangement information 1000 and/or the 2D image, may be additionally measured using the OCT part 170.

The processor 110 may determine the region 5, which is determined to be a region including a predetermined defect on the substrate 2, based on the element arrangement information 1000 and/or the 2D image obtained from the memory 120. The 2D image may be a picture obtained by actually photographing the form of the substrate 2 and the coated film. The element arrangement information 1000 may show the form of the substrate 2 and the expected form in which the coated film is spread according to a predetermined specification. The processor 110 may determine a region in which the current substrate 2 and the coated film have features different from the predetermined standard, by comparing the element arrangement information 1000 with the 2D image. That is, the processor 110 may determine that the corresponding feature is a defect. The processor 110 may derive the region 5 where the defect exists.

The processor 110 may derive the thickness of the derived region 5 using the OCT part 170. The processor 110 may control the second light source 150 and the second light detector 160 so as to obtain optical interference data (e.g., third optical interference data) generated by laser light reflected from the corresponding region 5. The processor 110 may derive the thickness of the coated film spread on the corresponding region 5 based on the obtained optical interference data (e.g., the third optical interference data).

According to an embodiment, the operation of deriving an additional measurement target region based on a defective region may be performed independently from the above-described operation of deriving an additional measurement region based on the 2D image.

Also, according to an embodiment, the processor 110 may derive a region (e.g., a fourth region) including an electrode part based on the electrode position information 3000 indicating the positions of electrodes of elements on the substrate 2, and may additionally measure the thickness of the region (e.g., the fourth region) by controlling the OCT part 170. In the present disclosure, the electrode position information 3000 may be information indicating the positions of the electrodes of the elements disposed on the substrate 2. For example, each element may have an electrode part in order to connect fine wiring between an element and the substrate. The electrode may be referred to as an element leg or a chip leg. The electrode position information 3000 may indicate the positions where the electrodes of elements exist on the substrate 2. Generally, at the electrode part of an element, fluorescent pigments may agglomerate by the density of element legs, whereby thickness measurement based on the 2D image may be inaccurate. Accordingly, the thickness of the part where the electrode of an element exists may be additionally measured using the OCT, whereby the accuracy of the process of measuring the overall thickness may be increased.

The processor 110 may be aware of the positions where the electrodes of the elements exist on the substrate 2 based on the electrode position information 3000 obtained from the memory 120. The processor 110 may derive a region (e.g., the fourth region) where an electrode exists on the substrate 2. According to an embodiment, the corresponding region (e.g., the fourth region) may be selected from among regions in which the amount of spread obtained from the 2D image exceeds a predetermined amount of spread (i.e., regions excluding the first region).

The processor 110 may measure the thickness of the derived region (e.g., the fourth region) using the OCT part 170. The processor 110 may control the second light source 150 and the second light detector 160 so as to obtain optical interference data (e.g., fourth optical interference data) generated by laser light reflected from the corresponding region (e.g., the fourth region). The processor 110 may derive the thickness of the coated film spread on the corresponding region (e.g., the fourth region) based on the obtained optical interference data (e.g., the fourth optical interference data).

Figure 5:
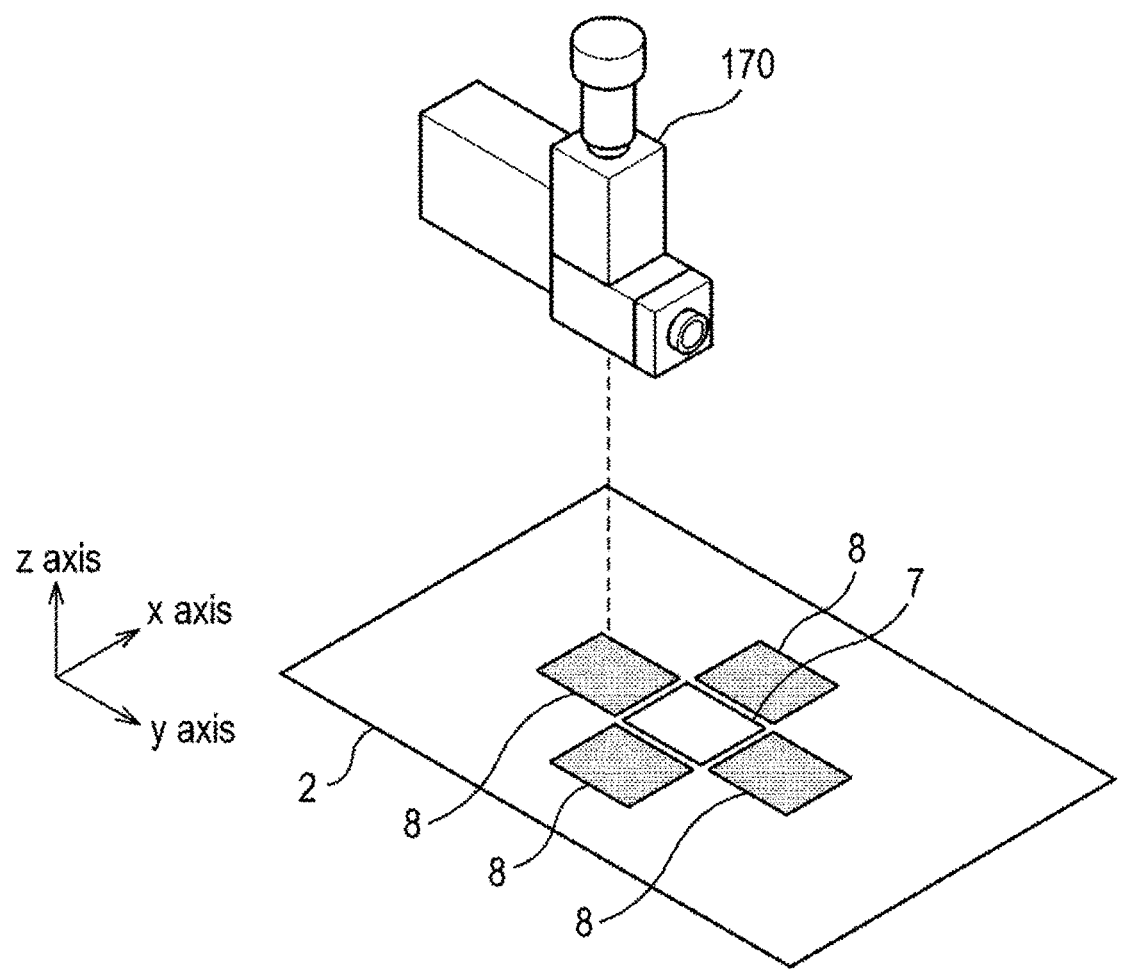
FIG. 5 is a diagram illustrating a process in which an inspection apparatus additionally measures a region adjacent to the derived OCT measurement target region, according to an embodiment of the present disclosure.

FIG. 5 is a diagram illustrating a process in which the inspection apparatus 10 additionally measures a region adjacent to a derived OCT measurement target region according to an embodiment of the present disclosure. In the case of regions on the substrate 2 derived according to various embodiments of the present disclosure, that is, regions 7 to which additional thickness measurement is performed using the OCT, the inspection apparatus 10 may additionally measure the thickness of a region 8 adjacent to the region 7 using the OCT.

The derived regions 7 may be regions where thickness measurement using the OCT may be performed in addition to 2D photographic inspection for accurate coated film thickness measurement. The regions adjacent to the regions 7 may have features similar to those of the regions 7 in association with the substrate 2 or the coated film. Accordingly, in order to secure the accuracy of the overall thickness measurement, the additional thickness measurement using the OCT may be performed with respect to the adjacent regions.

Here, the adjacent regions indicate regions located close to the corresponding region 7 when the substrate 2 is divided into a plurality of regions. According to an embodiment, the adjacent region may indicate a region that shares a boundary line with the corresponding region 7 from among the plurality of regions. According to an embodiment, the adjacent region may indicate a region located within a predetermined radius from the center of the corresponding region 7, from among the plurality of regions. According to an embodiment, when axes corresponding to the horizontal direction and vertical direction of the substrate are the x-axis and y-axis, respectively, the adjacent region may be a region that is located in the +x-axis direction, the −x-axis direction, the +y-axis direction, or the −y-axis direction of the corresponding region 7 and shares a boundary line with the corresponding region 7. According to an embodiment, the adjacent region may include a region that shares a vertex with the corresponding region 7 and is located in the diagonal direction, from among the plurality of regions.

According to an embodiment, the processor 110 may remeasure a thickness using the OCT, based on the amount of spread derived from the 2D image and a thickness value measured by the OCT part 170. According to an embodiment, when the difference between the thickness value of the coated film of a corresponding region, which is derived from the amount of spread based on the qualitative analysis, and the thickness value measured using the OCT is greater than or equal to a predetermined value, the thickness of the corresponding region may be remeasured using the OCT. Also, according to an embodiment, based on the derived amount of spread and the derived thickness value, when it is determined that the amount of spread and the thickness value do not satisfy a predetermined reference, a thickness may be remeasured. Here, the predetermined reference may be a reference to determine whether at least one of the derived amount of spread or the derived thickness is wrongly measured, in consideration of the relationship between the amount of spread and the thickness that were previously measured. That is, when it is determined that the measurement has an error in consideration of the amount of spread and the thickness value, measurement may be performed again. Also, according to an embodiment, the processor 110 may control the OCT part 170 and may remeasure the thickness of a region adjacent to the corresponding region, based on the amount of spread of the corresponding region derived from the 2D image and the thickness value of the corresponding region measured by the OCT part 170.

Figure 6:
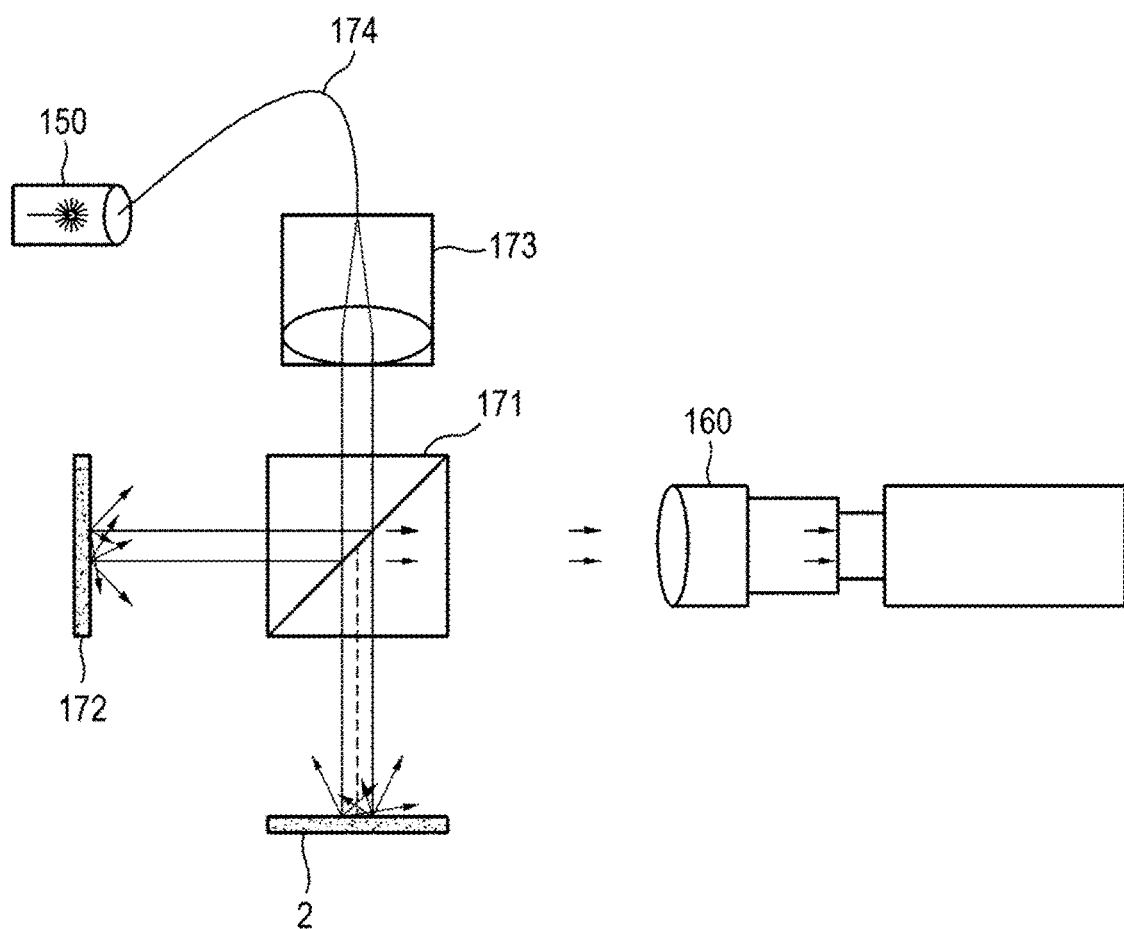
FIG. 6 is a diagram illustrating a first OCT part according to an embodiment of the present disclosure.

FIG. 6 is a diagram illustrating a first OCT part according to an embodiment of the present disclosure. The above-described OCT part 170 may be implemented as the first OCT part or a second OCT part according to an embodiment.

The first OCT part may further include a beam splitter 171 and a reference mirror 172, in addition to the second light source and the second light detector. The beam splitter 171 may adjust an optical path of laser light radiated from the second light source 150, and the reference mirror 172 may reflect the laser light transferred from the beam splitter 171 so as to generate the reference light. The first OCT part may be used to obtain optical interference data from interference light generated by the interference between measurement light, which is laser light reflected from the coated film of the substrate 2, and reference light, which is laser light reflected from the reference mirror 172.

Particularly, the second light source 150 may radiate the laser light. According to an embodiment, the second light source 150 may directly radiate the laser light onto the beam splitter 171. According to an embodiment, the second light source 150 may transfer the laser light to a convex lens 173 via an optical fiber 174, and the laser light passing through the convex lens 173 may be transferred to the beam splitter 171.

The beam splitter 171 may adjust an optical path such that part of the laser light received from the second light source 150 passes through the beam splitter 171 and proceeds to the coated film of the substrate 2, and may adjust an optical path such that another part of the laser light is reflected and proceeds to the reference mirror 172.

The part of the laser light, of which the optical path is adjusted such that the part of the laser light proceeds to the coated film of the substrate 2, may be reflected from the coated film of the substrate 2. As described above, the laser light may be reflected from the surface of the coated film, or may penetrate to a predetermined depth from the surface of the coated film and may be backscattered depending on the wavelength of the laser light. The reflected light or scattered light may be referred to as measurement light. The measurement light may proceed to the beam splitter 171, and may be transferred to the second light detector 160 by the beam splitter 171.

The other part of the laser light, of which the optical path is adjusted such that the other part of the laser light proceeds to the reference mirror 172, may be reflected by the reference mirror 172. The reflected light may be referred to as reference light. The reference light may pass through the beam splitter 171, and may be transferred to the second light detector 160.

The second light detector 160 may capture interference light generated by the measurement light and the reference light. The second light detector 160 may capture the interference light, and may obtain the optical interference data (e.g., the first optical interference data). The processor 110 may obtain the optical interference data from the second light detector 160, may generate a sectional image of the coated film based on the optical interference data, and may derive the thickness of the coated film spread on a corresponding region of the substrate 2.

Figure 7:
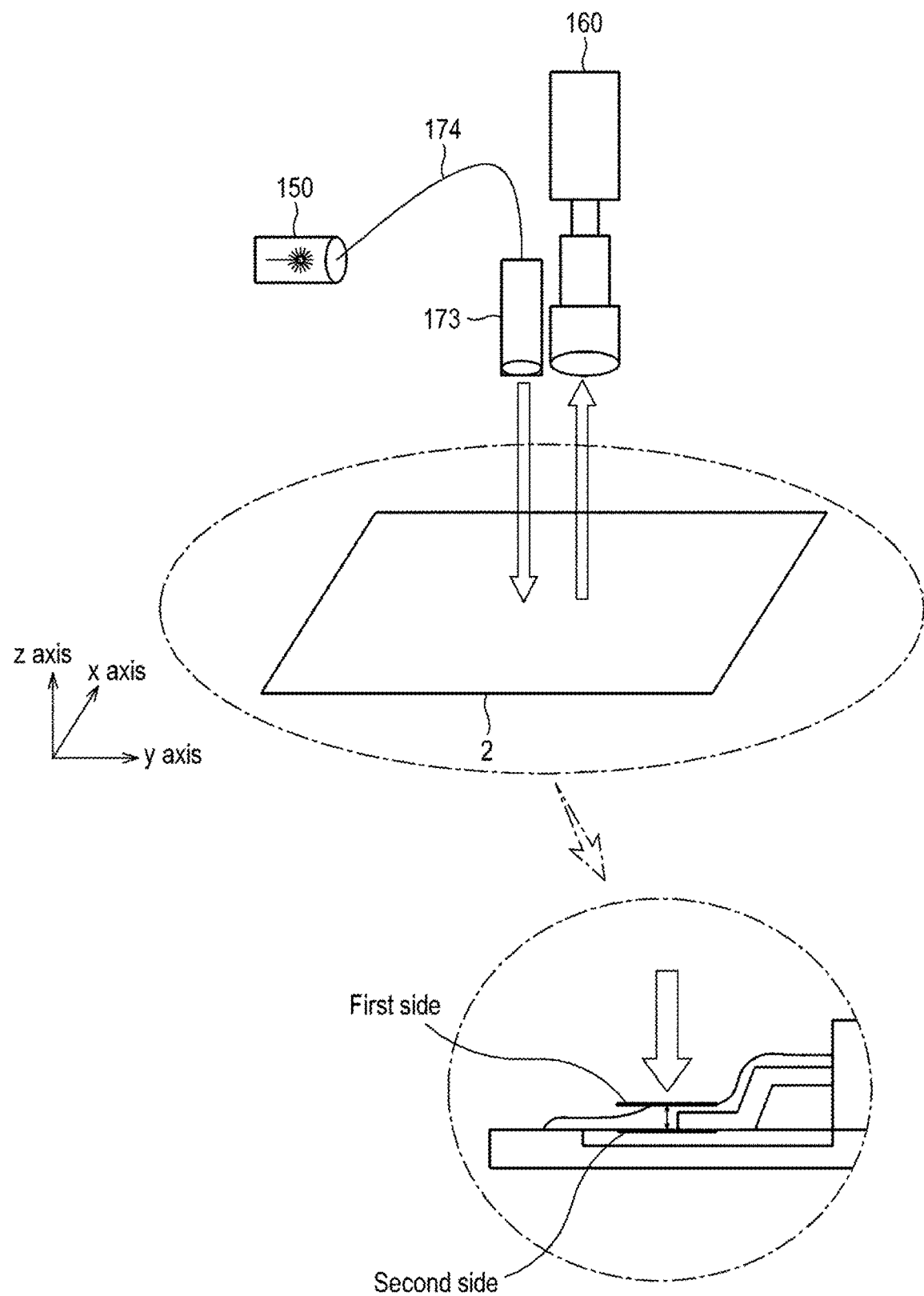
FIG. 7 is a diagram illustrating a second OCT part according to an embodiment of the present disclosure.

FIG. 7 is a diagram illustrating a second OCT part according to an embodiment of the present disclosure. The second OCT part may include the second light source 150 and/or the second light detector 160. The second OCT part may not need the beam splitter 171 and the reference mirror 172. The second OCT part may be used to obtain optical interference data from interference light generated by interference between reflected light, which is laser light reflected from the surface of the coated film of the substrate 2, and scattered light, which is laser light that passes through the coated film and is backscattered from the boundary between the coated film and the substrate 2 on which the coated film is spread. Here, the reflected light reflected from the surface of the coated film may act as the above-described reference light, and the scattered light may act as the measurement light.

Particularly, the second light source 150 may radiate laser light onto the coated film of the substrate 2. In this instance, the laser light may be radiated along a first direction. The first direction may be a direction that corresponds to a straight line inclined at a predetermined angle from the direction of a normal line of the substrate. According to an embodiment, the first direction may be the same as the direction of the normal line of the substrate. The axis corresponding to the direction of the normal line of the substrate is referred to as the z-axis. The z-axis may be a direction corresponding to the depth direction of the coated film. As described above, the second light source 150 may directly radiate the laser light, but may alternatively radiate the laser light via the optical fiber 174 and/or the convex lens 173.

The laser light may be reflected from the surface of the coated film. Particularly, the laser light may be reflected from a first side, which is illustrated in FIG. 7. Further, the laser light may penetrate the coated film, and may be backscattered from the boundary between the coated film and the substrate on which the coated film is spread. Particularly, the laser light may be backscattered from a second side, which is illustrated in FIG. 7. The reflected light and scattered light may generate the interference light, and the interference light may proceed in the direction reverse to the above-described first direction. That is, the radiated laser light and the above-described interference light may proceed along the same axis but in different respective directions. The second light detector 160 may capture the interference light that proceeds in the direction opposite to the first direction. The second light detector 160 may obtain optical interference data (e.g., the first optical interference data) from the captured interference light. The processor 110 may obtain the optical interference data from the second light detector 160, may generate the sectional image based on the optical interference data, and may derive the thickness of the coated film spread on a corresponding region of the substrate 2.

In the case of the thickness measurement using the second OCT part, the reflected light and the scattered light may perform the roles of the reference light and the reflected light of the above-described first OCT part, respectively. That is, the surface of the coated film itself may act as the reference mirror 172 of the above-described first OCT part.

According to an embodiment, when the reflectivity of the surface of the coated film is greater than or equal to a predetermined reference value, an OCT part of a type the same as that of the second OCT part may be used. The predetermined reference value may be the minimum reflectivity that is needed when the surface of the coated film performs the role of the reference mirror 172. According to an embodiment, the radiation angle at which the laser light is to be radiated may be adjusted such that the reflectivity of the surface of the coated film is greater than or equal to a reference value. According to an embodiment, the laser light may be radiated onto a region where the surface of the coated film is parallel to the substrate, such that the reflectivity of the surface of the coated film is greater than or equal to the reference value. In the case of the thickness measurement using the second OCT part of the present disclosure, the reflectivity of the surface of the coated film may indicate the ratio of reflected light reflected from the surface of the coated film to the laser light radiated onto the coated film.

According to an embodiment, the reflectivity of the surface of the coated film may be determined based on the mixing ratio of fluorescent pigments of the corresponding coated film. According to an embodiment, the surface of a coated film mixed with fluorescent pigments may have higher reflectivity than that of a coated film that is not mixed with the fluorescent pigment. As the mixing ratio of fluorescent pigments of the coated film increases, the reflectivity of the surface of the coated film may increase. That is, when a coated film mixed with the fluorescent pigments is used, the reflectivity of the surface of the coated film increases, whereby thickness measurement using the second OCT part may be easily performed. According to an embodiment, the mixing ratio of the fluorescent pigments of the coated film may be set to a value that enables the reflectivity of the surface of the coated film to exceed a predetermined reference value. According to an embodiment, the reference value may be the minimum reflectivity that is needed when the surface of the coated film performs the role of the reference mirror 172, or may be a value arbitrarily set according to the intention of a user.

According to an embodiment, the backscattering ratio of the coated film may also be determined based on the mixing ratio of the fluorescent pigments of the corresponding coated film. According to an embodiment, a coated film mixed with the fluorescent pigments may have a higher backscattering ratio than that of a coated film that is not mixed with the fluorescent pigments. In the case of the thickness measurement using the second OCT part of the present disclosure, the backscattering ratio of the coated film may indicate the ratio of scattered light that is backscattered to the laser light radiated onto the coated film. As the mixing ratio of the fluorescent pigments of the coated film increases, the backscattering ratio of the coated film may increase. That is, when a coated film mixed with the fluorescent pigments is used, the backscattering ratio of the coated film increases, whereby thickness measurement using the second OCT part may be easily performed. According to an embodiment, the mixing ratio of the fluorescent pigments of the coated film may be set to a value that enables the backscattering ratio of the coated film to exceed a predetermined reference value.

According to an embodiment, the surface of the coated film may be formed to be a curved surface. According to an embodiment, the surface of the coated film may be formed to be a convexly curved surface, a concavely curved surface, or a curved surface provided in an arbitrary shape for the substrate. According to an embodiment, in the case in which the surface of the coated film is a curved surface, the thickness measurement using the second OCT part may be more easily performed than the case in which the surface of the coated film is a flat surface.

According to an embodiment, the second OCT part may not dispose an additional element, such as a window glass or the like, on the coated film of the substrate 2. The second OCT part according to the present disclosure uses reflected light, which is reflected from the surface of the coated film, as the reference light, and obtains the optical interference data. Accordingly, an additional separate element needed for generating the reference light, such as a window glass or the like, may not be needed.

Figure 8:
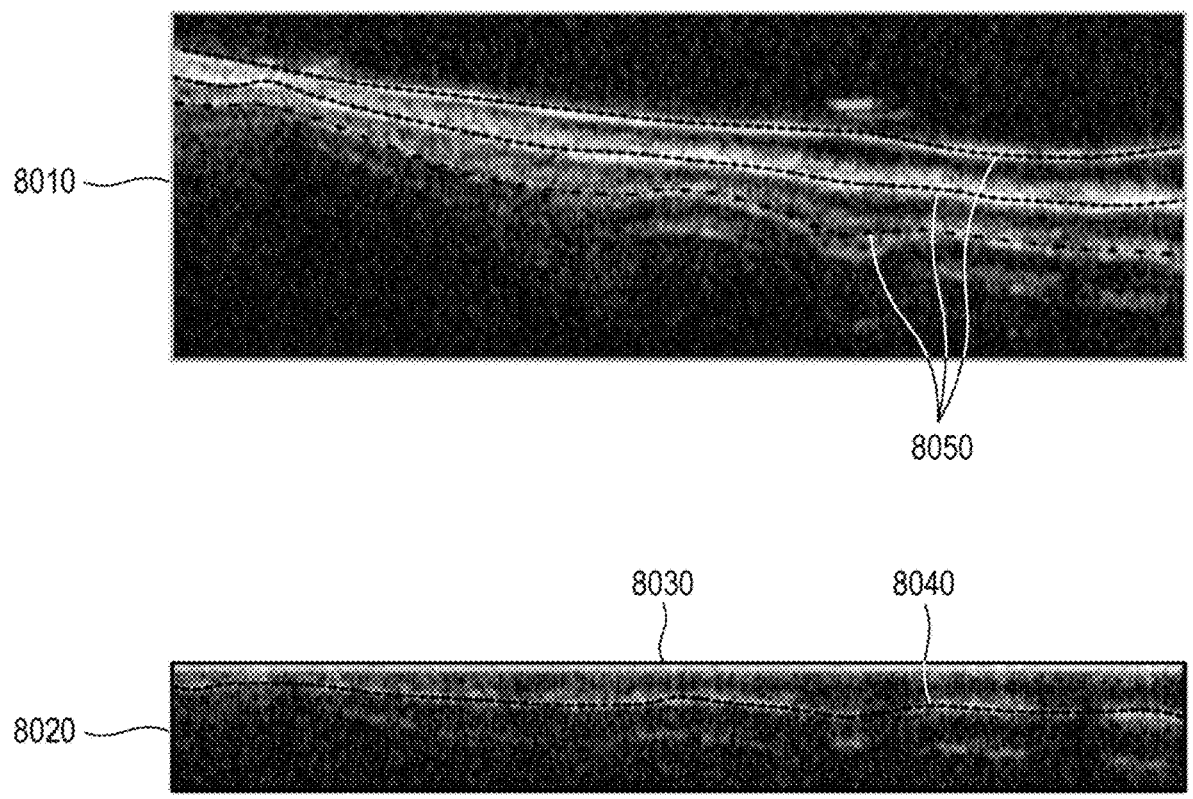
FIG. 8 is a diagram illustrating a sectional image and a boundary line in the sectional image according to an embodiment of the present disclosure.

FIG. 8 is a diagram illustrating a sectional image and a boundary line in the sectional image according to an embodiment of the present disclosure. The processor 110 may derive the thickness of the coated film spread on a predetermined region from the obtained optical interference data. The processor 110 may generate a sectional image from the optical interference data, and may derive the thickness of the coated film using information obtained from the sectional image.

According to the present disclosure, in an object measurement using the OCT, the sectional image is a 2D image of a section cut in the depth direction of an object (coated film). The sectional image may be generated based on the measured optical interference data. The sectional image may include boundary lines (boundary patterns) corresponding to the boundary between air and the coated film and the boundary between the coated film and the substrate.

Particularly, the processor 110 may obtain a sectional image as shown in FIG. 8 using the optical interference data obtained by the second light detector 160. The sectional image may be an image showing a section cut in the −z-axis direction, that is, the depth direction, of the substrate 2 and the coated film. That is, the sectional image may show the inside of the coated film and the substrate via penetration in the depth direction from the surface of the coated film.

A sectional image 8010 may be a sectional image that may be obtained by the above-described first OCT part. The sectional image 8010 may include one or more boundary lines 8050. Each of the boundary lines 8050 may be the boundary between air and the coated film, in other words, the boundary line corresponding to the surface of the coated film, or may be the boundary line corresponding to the boundary between the coated film and the substrate 2 or an electrode on which the coated film is spread. The processor 110 may derive the thickness of the coated film using the distance between the boundary lines corresponding to the respective boundaries.

Particularly, the sectional image 8010, which is based on a reference mirror surface, may be obtained using the first OCT part. The processor 110 may determine a boundary line indicating the boundary between air and the coated film from the sectional image 8010. Also, the processor 110 may determine a boundary line indicating the boundary between the coated film and the substrate 2 on which the coated film is spread from the sectional image 8010. The processor 110 may derive a vertical distance between the two determined boundary lines in the sectional image 8010, and may determine the vertical distance as the thickness of the coated film. According to an embodiment, the processor 110 may apply a predetermined scaling factor to the determined vertical distance, and may determine the derived value as the thickness of the coated film.

According to an embodiment, the processor 110 may use a predetermined segmentation algorithm in order to separate the boundary line indicating the boundary between air and the coated film and the boundary line indicating the boundary between the coated film and the substrate 2 among the plurality of boundary lines 8050 in the sectional image 8010. Also, the processor 110 may perform the above-described boundary line segmentation using accumulated information indicating the relationship between the boundary lines of the sectional image and the boundaries among air, the coated film and the substrate, which is collected in a database and is stored on the memory 120. According to an embodiment, the processor 110 may determine the direction in which boundary lines (boundary patterns) of the sectional image 8010 are to be detected first from among the vertical direction or the horizontal direction, and may detect a boundary line in the determined direction. According to an embodiment, the processor 110 distinguishes an overlapping boundary line generated by multiple reflections, among the detected boundary lines, and may exclude the overlapping boundary line when the thickness is measured.

The sectional image 8020, which is based on a surface of the coated film, may be obtained using the second OCT part. The sectional image 8020 may include one or more boundary lines 8040. One of the boundary lines 8040 may be a boundary line corresponding to the boundary between the coated film and the substrate 2 or the electrode on which the coated film is spread. The processor 110 may derive the thickness of the coated film using the interval between the corresponding boundary line 8040 and an upper edge 8030 of the sectional image 8020.

Particularly, when the second OCT part is used, the processor 110 may detect the boundary line 8040 indicating the boundary between the coated film and the substrate 2 on which the coated film is spread. The processor 110 may determine, as the corresponding boundary line 8040, the boundary line that appears first in the depth direction from the upper edge of the sectional image 8020. Also, in the case of the second OCT part, the optical interference data is generated using the reflected light which is reflected from the surface of the coated film. Accordingly, the sectional image may show a section cut in the −z-axis direction, that is, in the depth direction, from the surface of the coated film by taking the surface of the coated film as an origin point. Accordingly, the upper edge 8030 of the sectional image 8020 obtained by the second OCT part may correspond to the surface of the coated film. The processor 110 may derive the vertical distance between the detected boundary line 8040 and the upper edge 8030 of the sectional image 8020, and may determine the vertical distance as the thickness of the coated film. According to an embodiment, the processor 110 may determine, as the thickness of the coated film, a value derived by applying a predetermined scaling factor to the derived vertical distance.

According to an embodiment, the thickness measurement of the coated film of the substrate using the OCT may be performed in a vacuum or in some other medium. That is, laser light radiation of the OCT part 170 and reflected light movement may be performed in a vacuum or another medium, instead of air.

FIG. 9 is a diagram illustrating measurement ranges of the first OCT part and the second OCT part according to an embodiment of the present disclosure. A sectional image 9010 shown in FIG. 9 may be a sectional image that may be obtained by the first OCT part. The sectional image 9010 may include a boundary line indicating the boundary between air and the coated film and a boundary line indicating the boundary between the coated film and the substrate (PCB). Also, a sectional image 9020 shown in FIG. 9 may be a sectional image that may be obtained by the second OCT part. The sectional image 9020 may include a boundary line indicating the boundary between the coated film and the substrate (PCB).

According to an embodiment, the sectional image 9010 may be bigger than the sectional image 9020. That is, the amount of data of the sectional image 9010 may be bigger than that of the sectional image 9020. In the case of the measurement using the second OCT part, unlike the first OCT part, the reflected light that is reflected from the surface of the coated film is used as the reference light, and thus the start of the measurement range in the depth direction (the −z-axis direction) is limited to the surface of the coated film.

Referring to a sectional diagram 9030 shown in FIG. 9, in the case of the thickness measurement of the coated film using the first OCT part, a measurement range 9040, which takes into consideration all differences in height among the elements installed on the substrate 2, may be needed in order to obtain a meaningful measurement result. However, in the case of the thickness measurement of the coated film using the second OCT part, a meaningful thickness measurement result may be obtained using only a measurement range 9050 corresponding to the maximum predicted thickness of the coated film. That is, the inspection apparatus 10 may reduce a measurement range in the depth direction, which is needed in order to measure the thickness of the coated film, depending on the type of the OCT part 170, whereby operational capacity for processing a measurement result and memory for storage may be reduced.

Also, in the case of the thickness measurement the coated film using the second OCT part, the reference mirror 172 is not used, and thus the possibility of a measurement error by saturation with reflected light may be reduced. When the amount of output of radiated light exceeds a predetermined amount of light, the amount of reflected light increases, and thus optical interference data or an interference signal shown in the sectional image may be saturated. In the case of such saturation, an interference signal may appear, irrespective of an interference signal generated by a measurement object, thereby impeding accurate measurement. Such saturation may more frequently occur in the case of the first OCT part, which uses the highly reflective reference mirror 172. The second OCT part excludes the use of the reference mirror, whereby measurement error by saturation may be reduced.

FIG. 10 is a diagram illustrating an embodiment of a substrate inspection method that may be performed by the inspection apparatus 10 according to the present disclosure. Although the flowchart has described that the operations of a method and an algorithm according to the present disclosure are performed sequentially, the operations may be performed in a different order that is arbitrary combined based on the present disclosure, in addition to being performed in the sequential order. The descriptions associated with the flowchart do not exclude modification or correction of the method or the algorithm, and do not indicate that a predetermined operation is essential or preferable. According to an embodiment, at least some operations may be performed in parallel, repetitively, or heuristically. According to an embodiment, at least some operations may be omitted, or other operations may be added.

The inspection apparatus 10 according to the present disclosure may perform a substrate inspection method according to various embodiments of the present disclosure in order to perform a substrate inspection. The substrate inspection method according to an embodiment of the present disclosure may include: a step S100 of radiating ultraviolet light onto a coated film of a substrate; a step S200 of obtaining a 2D image of the substrate; a step S300 of deriving one region among a plurality of regions of the substrate based on the 2D image; a step S400 of radiating laser light onto the one region and obtaining optical interference data generated from the one region; and/or a step S500 of deriving a thickness of the coated film of the one region based on the optical interference data.

In step S100, the first light source 130 of the inspection apparatus 10 may radiate the ultraviolet light onto the coated film of the substrate 2, the coated film being mixed with the fluorescent pigments. In step S200, the first light detector 140 of the inspection apparatus 10 may capture fluorescence generated from the coated film onto which the ultraviolet light is radiated, and may obtain a 2D image of the substrate. In step S300, the processor 110 of the inspection apparatus 10 may derive one region among the plurality of regions of the substrate based on the 2D image. In step S400, the second light source 150 may radiate the laser light onto the derived one region, and the second light detector 160 may obtain optical interference data (e.g., the first optical interference data or the like) generated from the one region, by the laser light. Here, the optical interference data may be associated with the interference light of the reference light and the measurement light generated by the first OCT part, or the interference light of the reflected light (acting as the reference light) and the scattered light (acting as the measurement light) generated by the second OCT part. In step S500, the processor 110 may derive the thickness of the coated film spread on the one region of the substrate 2 based on the optical interference data. In the present disclosure, the amount of spread may be derived based on the 2D image according to various embodiments. Also, the thickness may be measured using the OCT part 170 according to various embodiments.

According to an embodiment, step S300 of deriving the one region may include an operation in which the processor 110 derives the amount of spread of the coated film for each of the plurality of regions based on the 2D image of the substrate 2, and/or a step in which the processor 110 determines, as the above-described one region, a region of which the amount of spread is less than or equal to a predetermined amount of spread.

According to an embodiment, step S300 of deriving the one region may include a step in which the processor 110 determines the above-described one region based on information about a region of interest set in advance by a user.

According to an embodiment, the region of interest may be a region including electrodes of elements on the substrate.

According to an embodiment, step S300 of deriving the one region may include a step in which the processor 110 determines a region, which is determined to be a region including a defect on the substrate based on the 2D image, as the above-described one region.

According to an embodiment, the region including the electrode may be derived by the processor 110 based on element arrangement information indicating the arrangement of elements on the substrate.

According to an embodiment, the reflected light which is reflected from the surface of the coated film may be used as the reference light. According to an embodiment, the second light source 150 of the second OCT part may radiate laser light onto the coated film of the substrate 2 along a first direction. Also, the second light detector 160 of the second OCT part may capture the interference light that proceeds in the direction opposite to the first direction.

According to an embodiment, the interference light may be interference light generated by the interference between the reflected light, which is laser light reflected from the surface of the coated film, and the scattered light, which is laser light that penetrates the coated film and is scattered from the boundary between the coated film and the substrate. The interference light may be interference light generated from the above-described one region derived from among the plurality of regions.

According to an embodiment, step S500 of deriving the thickness of the coated film of the one region may include: a step in which the processor 110 obtains a sectional image of a section cut in the first axial direction (i.e. the z-axis direction) corresponding to the depth direction of the coated film based on the above-described optical interference data (e.g., first optical interference data or the like); and/or a step in which the processor 110 determines the thickness of the coated film spread on the above-described one region based on a boundary line in the sectional image.

Various embodiments of the present disclosure may be implemented as software on a machine-readable storage medium. The software may be software for implementing various embodiments of the present disclosure. The software may be inferred from various embodiments of the present disclosure by programmers in the field of the art to which the present disclosure belongs. For example, the software may be a program including instructions (e.g., code or code segments) which are readable by a device. The device may be a device such as a computer, which is operable according to instructions retrieved from a storage medium. According to an embodiment, the device may be the inspection apparatus 10 according to embodiments of the present disclosure. According to an embodiment, a processor of the device may execute retrieved instructions, such that the elements of the device perform functions corresponding to the instructions. According to an embodiment, the processor may be the processor 110 according to embodiments of the present disclosure. The storage medium may indicate all types of recording media storing data which are readable by a device. The storage medium may include, for example, ROM, RAM, a CD-ROM, magnetic tape, a floppy disk, an optical data storage device, or the like. According to an embodiment, the storage medium may be the memory 120. According to an embodiment, the storage medium may be implemented to be distributed in computer systems or the like connected via a network. The software may be stored distributedly on a computer system or the like, and may be executed. The storage medium may be a non-transitory storage medium. The non-transitory storage medium indicates a tangible medium that exists irrespectively of semi-permanent or temporary storage of data, and does not include a signal that is propagated in a transient manner.

According to the various embodiments of the present disclosure, a substrate inspection apparatus can accurately measure the thickness of a coated film even when the coated film is as thin as a predetermined thickness (e.g., 30 μm) or less.

According to the various embodiments of the present disclosure, the substrate inspection apparatus can shorten the amount of time spent measuring the thickness of a coated film of the entire substrate by sampling a predetermined region.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A substrate inspection apparatus comprising:
    a first light source configured to radiate an ultraviolet light onto a coated film of a substrate, the coated film being mixed with fluorescent pigments;
    a first light detector configured to capture fluorescence generated from the coated film onto which the ultraviolet light is radiated, and to obtain a two-dimensional (2D) image of the substrate;
    a memory (120) configured to store information indicating a predetermined region of interest on the substrate;
    a processor configured to determine a first region among a plurality of regions of the substrate based on the 2D image and the information indicating the region of interest;
    a second light source configured to radiate a laser light onto the first region; and
    a second light detector configured to obtain optical interference data generated from the first region by the laser light,
    wherein the processor is configured to derive a thickness of the coated film of the first region based on the optical interference data, and
    wherein the region of interest is a region that includes electrodes of elements on the substrate.

2. The substrate inspection apparatus of claim 1, wherein the processor is configured to:
    derive an amount of spread of the coated film for each of the plurality of regions based on the 2D image; and
    determine a second region among the plurality of regions, wherein an amount of spread of the second region is less than or equal to a predetermined amount, and
    wherein the second light source radiates a laser light onto the second region, the second light detector obtains optical interference data generated from the second region, and the processor derives a thickness of the coated film of the second region based on the optical interference data from the second region.

3. The substrate inspection apparatus of claim 1, wherein the processor is configured to determine a third region among the plurality of regions, the third region including a defect on the substrate based on the 2D image, and
    wherein the second light source radiates a laser light onto the third region, the second light detector obtains optical interference data generated from the third region, and the processor derives a thickness of the coated film of the third region based on the optical interference data from the third region.

4. The substrate inspection apparatus of claim 1, wherein the memory is further configured to store element arrangement information indicating arrangement of the elements on the substrate,
    wherein the processor is further configured to determine a fourth region including the electrodes among the plurality of regions by comparing the element arrangement information with the 2D image, and
    wherein the second light source radiates a laser light onto the fourth region, the second light detector obtains optical interference data generated from the fourth region, and the processor derives a thickness of the coated film of the fourth region based on the optical interference data from the fourth region.

5. The substrate inspection apparatus of claim 1, wherein a reflected light which is reflected from a surface of the coated film is used as a reference light.

6. The substrate inspection apparatus of claim 5, wherein the processor is further configured to:
    obtain a sectional image showing a section cut in a first axial direction corresponding to a depth direction of the coated film, based on the optical interference data from the first region; and
    determine the thickness of the coated film of the first region based on a boundary line in the sectional image.

7. The substrate inspection apparatus of claim 5, wherein a reflectivity of the surface of the coated film with respect to the laser light is determined based on a fluorescent pigment mixing ratio of the coated film with which the fluorescent pigments are mixed, and
    wherein the fluorescent pigment mixing ratio is set to a value that enables the reflectivity to exceed a predetermined reference value.

8. The substrate inspection apparatus of claim 5, wherein the coated film is formed of at least one material selected from among acrylic, urethane, polyurethane, silicone, epoxy, an ultraviolet (UV) curable material, and an infrared (IR) curable material.

9. The substrate inspection apparatus of claim 5, wherein the surface of the coated film is formed to be a curved surface.

10. A substrate inspection method comprising:
    radiating an ultraviolet light onto a coated film of a substrate, the coated film being mixed with fluorescent pigments;
    obtaining a 2D image of the substrate by capturing fluorescence generated from the coated film onto which the ultraviolet light is radiated;

determining a first region among a plurality of regions of the substrate based on the 2D image and information indicating a predetermined region of interest on the substrate;

radiating a laser light onto the first region and obtaining optical interference data generated from the first region by the laser light; and deriving a thickness of the coated film of the first region based on the optical interference data, wherein the region of interest is a region that includes electrodes of elements on the substrate.

11. The substrate inspection method of claim 10, comprising:

deriving an amount of spread of the coated film for each of the plurality of regions based on the 2D image;

determining a second region among the plurality of regions, wherein an amount of spread of the second region is less than or equal to a predetermined amount;

radiating a laser light onto the second region and obtaining optical interference data generated from the second region; and deriving a thickness of the coated film of the second region based on the optical interference data from the second region.

12. The substrate inspection method of claim 10, comprising:

determining a third region among the plurality of regions, the third region including a defect on the substrate based on the 2D image, and radiating a laser light onto the third region and obtaining optical interference data generated from the third region; and deriving a thickness of the coated film of the third region based on the optical interference data from the third region.

13. The substrate inspection method of claim 10, comprising:

determining a fourth region including the electrodes among the plurality of regions by comparing the 2D image with element arrangement information indicating arrangement of the elements on the substrate, radiating a laser light onto the fourth region and obtaining optical interference data generated from the fourth region; and deriving a thickness of the coated film of the fourth region based on the optical interference data from the fourth region.

14. The substrate inspection method of claim 10, wherein a reflected light which is reflected from a surface of the coated film is used as a reference light.

15. The substrate inspection method of claim 14, wherein the deriving the thickness of the coated film comprises:

obtaining a sectional image showing a section cut in a first axial direction corresponding to a depth direction of the coated film, based on the optical interference data from the first region; and determining the thickness of the coated film of the first region based on a boundary line in the sectional image.

16. The substrate inspection method of claim 14, wherein a reflectivity of the surface of the coated film with respect to the laser light is determined based on a fluorescent pigment mixing ratio of the coated film with which the fluorescent pigments are mixed; and wherein the fluorescent pigment mixing ratio is set to a value that enables the reflectivity to exceed a predetermined reference value.

* * * * *